United States Patent
Benhammou et al.

[19]

[11] Patent Number: 6,094,724
[45] Date of Patent: Jul. 25, 2000

[54] SECURE MEMORY HAVING ANTI-WIRE TAPPING

[75] Inventors: Jean-Pierre Benhammou, Colorado Springs, Colo.; Cedric V. Colnot, Ivry sur Seine, France

[73] Assignee: Atmel Corporation, San Jose, Calif.

[21] Appl. No.: 08/978,208

[22] Filed: Nov. 26, 1997

[51] Int. Cl.[7] .................................................. G06F 12/14
[52] U.S. Cl. ............................... 713/202; 902/26; 705/41
[58] Field of Search ................................... 713/202, 201, 713/200; 380/4, 21, 24; 235/380, 382; 705/41; 902/25, 26; 283/72

[56] References Cited

U.S. PATENT DOCUMENTS

| | | | |
|---|---|---|---|
| 4,734,568 | 3/1988 | Watanabe | 235/487 |
| 4,742,215 | 5/1988 | Daughters et al. | 235/487 |
| 4,757,534 | 7/1988 | Matyas et al. | 705/56 |
| 4,802,218 | 1/1989 | Wright et al. | 713/200 |
| 4,900,903 | 2/1990 | Wright et al. | 235/380 |
| 4,910,774 | 3/1990 | Barakat | 380/23 |
| 5,103,478 | 4/1992 | Matyas et al. | 380/21 |
| 5,729,717 | 3/1998 | Tamada et al. | 380/4 |
| 5,900,606 | 5/1999 | Rigal et al. | 235/382 |
| 5,963,980 | 10/1999 | Coulier et al. | 713/200 |

FOREIGN PATENT DOCUMENTS

| | | | |
|---|---|---|---|
| 0 152 024 | 1/1985 | European Pat. Off. | G07F 7/10 |
| 2 687 816 | 2/1992 | France | G06K 19/073 |
| WO88/09019 | 11/1988 | WIPO | G06K 5/00 |

*Primary Examiner*—Robert W. Beausoliel, Jr.
*Assistant Examiner*—Christopher Alan Revak
*Attorney, Agent, or Firm*—Sierra Patent Group, Ltd.

[57] ABSTRACT

According to a first aspect of the present invention, cryptography without a dedicated microprocessor on the smart card is employed to provide authentication of both the smart card and the smart card reader, and wherein the cryptography provides only a preselected number of attempts at authentication, if not reset, before access to the smart card is denied permanently. According to a second aspect of the present invention, access to each the memory zones of the smart card may be individually provided by cryptography, passwords or both.

15 Claims, 4 Drawing Sheets

| ZONE | $0 | $1 | $2 | $3 | $4 | $5 | $6 | $7 | |
|---|---|---|---|---|---|---|---|---|---|
| USER 0 | | | | | | | | | $000 |
| | | | | 256 BYTES | | | | | - |
| | | | | | | | | | - |
| | | | | | | | | | $0F8 |
| USER 1 | | | | | | | | | $100 |
| - | | | | | | | | | - |
| . | | | | | | | | | . |
| - | | | | | | | | | - |
| USER 8 | | | | | | | | | $8F8 |
| | | | | | | | | | $700 |
| USER 7 | | | | 256 BYTES | | | | | - |
| | | | | | | | | | - |
| | | | | | | | | | $7F8 |

32

30

| CONFIGURATION | $0 | $1 | $2 | $3 | $4 | $5 | $6 | $7 | |
|---|---|---|---|---|---|---|---|---|---|
| FABRICATION | ANSWER TO RESET | | | | LOT HISTORY CODE | | | | $00 |
| | FAB CODE | | RESERVED | | CARD MANUFACTURER CODE | | | | $08 |
| ACCESS | AR0 | AR1 | AR2 | AR3 | AR4 | AR5 | AR6 | AR7 | $10 |
| | RESERVED FOR FUTURE USE | | | | | | | | $18 |
| AUTHORIZATION | AAC | | IDENTIFICATION NUMBER (Nc) | | | | | | $20 |
| | CRYPTOGRAM (C) | | | | | | | | $28 |
| SECRET | SECRET SEED (Gc) | | | | | | | | $30 |
| TEST | RESERVED FOR MEMORY TEST | | | | | | | | $38 |
| PASSWORDS | PAC | WRITE 0 | | PAC | READ 0 | | | | $40 |
| | PAC | WRITE 1 | | PAC | READ 1 | | | | $48 |
| | PAC | WRITE 2 | | PAC | READ 2 | | | | $50 |
| | PAC | WRITE 3 | | PAC | READ 3 | | | | $58 |
| | PAC | WRITE 4 | | PAC | READ 4 | | | | $60 |
| | PAC | WRITE 5 | | PAC | READ 5 | | | | $68 |
| | PAC | WRITE 6 | | PAC | READ 6 | | | | $70 |
| | PAC | SECURE CODE/WRITE 7 | | PAC | READ 7 | | | | $78 |

34

30

| | BIT 7 | BIT 6 | BIT 5 | BIT 4 | BIT 3 | BIT 2 | BIT 1 | BIT 0 | |
|---|---|---|---|---|---|---|---|---|---|
| 36 | 0 | 0 | 0 | 0 | 0 | PER | CMA | FAB | $80 |

*FIG. 2*

SECURE MEMORY HAVING ANTI-WIRE TAPPING

BACKGROUND OF THE INVENTION

1. Field of the Invention

The present invention relates to secured memories. More particularly, the present invention relates to a secured memory which provides an authentication protocol for anti-wire tapping and different password sets for reading and writing to secured memory areas by the secured memory user.

2. The Prior Art

The use of plastic cards for payment has existed since the 1950's with the introduction of the Diner's Club card. The explosion in their use since that time has been nothing short of phenomenal. Today, millions of cards are issued annually by different organizations, so that their use for both payment and the recordation of information is now almost universal.

Originally, these plastic cards were embossed and had a signature line which could be used for comparison to maintain security. However, as can be imagined, this was not much of a deterrent to fraud and misuse. The first major security improvement was the addition of a magnetic stripe on the back of the embossed card. Plastic cards with a magnetic stripe are probably the most popular form of payment and information card available today. The memory storage provided by the magnetic stripe also permitted the recordation of far greater amounts of information than could be embossed on the face of a plastic card. Though these cards provide some level of protection, it is not all that difficult for the data stored on a magnetic stripe to be read, deleted and rewritten by anyone with access to the appropriate read/write device. Accordingly, it is less than suitable for the storage of confidential data, or for storing a value that can be used in place of currency.

In response to these limitations, a plastic card with a secure memory was developed. These cards are known in the industry as "smart cards". The storage area of the secure memory is often divided into blocks of memory. The object of providing security to a memory is to protect against unauthorized access to and tampering with these blocks. The security is typically provided by some combination of both hardware and software. With a secure memory it is possible to write confidential data that cannot be read or erased, and to prevent writing of data by controlling the reading, writing and erasing with the combination of hardware and software which depend upon particular conditions to occur prior to executing these operations.

An example of a "smart card" with a secure memory, and one which has been widely used is a telephone memory card. These cards are prepaid, and the value stored electronically in the memory is deducted during use by the appropriate amount. Of course, to prevent misuse it is necessary to prevent the user from tampering with the card to increment the stored value. If it were a magnetic stripe card, rewriting a new value to the card could be accomplished easily.

One manner known in the art to prevent tampering with the secured memory to increment a stored value is to provide a secure code that is known only to the issuer of the card. A systematic attack to determine the secure code is deterred by an attempt counter that prevents further use of the card if the number of attempts to present a valid secure code exceeds a predetermined number. When a valid secure code is presented prior to the attempt counter reaching its limit, the attempt counter is reset to zero. Each of these blocks are further protected by an erase code that must be presented before the storage block can be erased. Unfortunately, these erase codes are vulnerable to systematic attack.

Another manner of preventing tampering with telephone memory cards has been to make it virtually impossible to erase a memory cell once it has been written to. For this type of card, a fuse is typically blown which disables the erase function of the memory. Accordingly, as the reduction in the value in the card is made by writing to the memory, the additional value cannot be added to the memory by an erase. Though this is a fairly adequate way to prevent tampering, it is not attractive for the reason that once the value on the card has been depleted, the card cannot be reused by adding additional value to the card.

Another approach taken in the prior art which instead of password protection schemes has been to employ a microprocessor to provide encryption to identify the smart card as a valid smart card. This approach has several problems. First, the microprocessor is expensive, it consumes a lot of power, it requires a substantial amount of code to program it, and some type random access memory is needed. Second the microprocessor cards make the assumption, that the machine employed to read the cards is a legitimate machine. As such, the information provided by the card to the reader can be wire-tapped.

Accordingly, it is an object of the present invention to provide a layer of authentication by cryptography that does not require the use of a microprocessor in the smart card.

Another object of the present invention is to prevent wire-tapping by requiring the smart card and the card reader to authenticate each other using cryptography.

It is a further object of the present invention for each memory zone to be protected by either cryptography, passwords or both.

BRIEF DESCRIPTION OF THE INVENTION

According to a first aspect of the present invention, cryptography without a dedicated microprocessor on the smart card is employed to provide authentication of both the smart card and the smart card reader, and wherein the cryptography provides only a preselected number of attempts at authentication, if not reset, before access to the smart card is denied permanently.

According to a second aspect of the present invention, access to each of the memory zones of the smart card is individually provided by cryptography, passwords or both.

BRIEF DESCRIPTION OF THE DRAWINGS

FIG. 2 depicts a memory map of an EEPROM memory partitioned according to the present invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

According to the present invention it is contemplated that as many as four groups of individuals will be involved in the process of placing a secured memory integrated into a "smart" card. The first is the manufacturer of the secured memory. The second is the smart card manufacturer. The third is the issuer or distributor of the smart card. The fourth is the end user.

Figure 1:
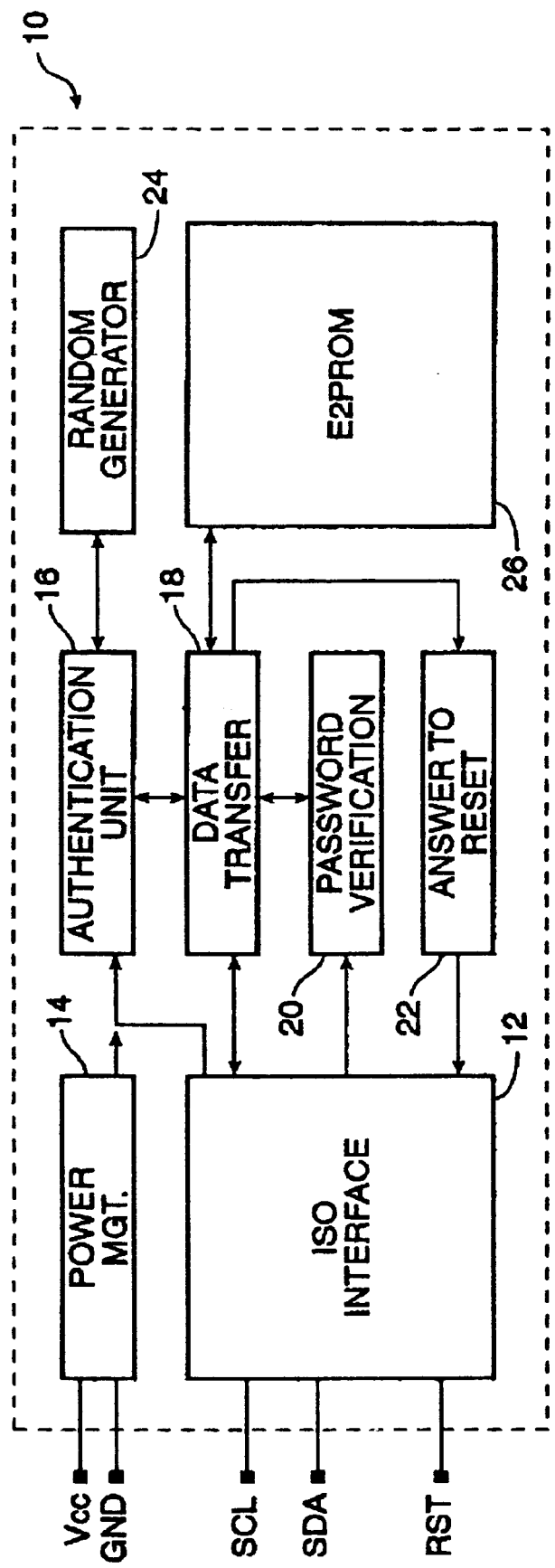
FIG. 1 illustrates a general architecture in block diagram of a secured memory according to the present invention.

An architecture of a secured memory 10 according to the present invention is shown as a block diagram in FIG. 1. Illustrated in the secured memory 10, are blocks for ISO interface 12, power management 14, authentication unit 16, data transfer 18, password verification 20, answer to reset 22, random number generator 24, and an EEPROM memory 26. The secured memory 10 has five pins, namely, $V_{CC}$, ground (GND), serial clock (SCL), serial data (SDA), and reset (RST). $V_{CC}$ and GND are connected to the power management 14, and SCL, SDA, and RST are connected to the ISO interface 12.

In the preferred embodiment, the $V_{CC}$ input is a 2.7 V to 5.5 V positive voltage supplied by the secured memory reader. The SCL input is employed to positive edge clock data into the device and negative edge clock data out of the device. The SDA pin is bi-directional for serial data transfer, and is open-drain driven and may be wired-ORed with any number of other open drain or open collector devices. When the RST input is pulsed high, the secured memory 10 will output the data programmed into a 32-bit answer to reset register in the EEPROM memory 26 in a data stream conforming to the ISO 7816-3 synchronous answer to reset protocol. When the secured memory 10 is unlocked, the well known ISO two-wire serial protocol is effective through the ISO interface 12, using SDA and SCL. The implementation of the ISO interface 12 and the answer to reset 22 are well within the level of skill of those of ordinary skill in the art and will not be disclosed herein to avoid overcomplicating the disclosure and thereby obscuring the present invention.

In preventing the unauthorized access to the EEPROM memory 18, two potential instances of unauthorized access must be addressed. The first instance arises because of the transmittal of the secured memory 10 from the manufacturer of the secured memory 10 to card manufacturer or the transmittal of the smart card from the card manufacturer to the card issuer. To prevent the unauthorized use of the secured memory 10 prior to the time it is personalized by the card issuer for the end user, a security code, typically referred to as a transport code, determined by the manufacturer and conveyed to the card manufacturer and the card issuer must be used to gain access to the secured memory. In the second instance, and according to the present invention, security must be provided to ensure that the end-user is authorized to use the smart card, and further, that both the smart card and the smart card reader are authentic.

Turning now to FIG. 2, a memory map 30 indicating the various memory partitions made to the EEPROM memory 26 is set forth. In memory map 30, the address in the EEPROM memory 26 of each memory partition is identified along with the number of bytes for each of the memory partitions. For example, User Zone 0, is found at addresses 0 through 0F8 (HEX) in the memory map 30 and is allocated 256 bytes. The memory map 20 of the EEPROM memory 18 has been divided into three sections for a more ready understanding of each of the memory partitions.

Section 32 of memory map 30 is partitioned into eight user zones of 256 bytes each.

Section 34 of memory map 30 contains partitions of a configuration zone. The partitions in section 34 are the Fabrication Zone, Access Zone, Authentication Zone Secret Seed Zone, Test Zone, and a Password Zone. Several of these partitions have further partitions that will be discussed below.

The Fabrication Zone is further partitioned into an Answer to Reset, Lot History Code, Fab Code, and Card Manufacturer Code. The Answer to Reset is a 32-bit register, the Lot History Code is a 32-bit register, and the Fab code is a 16-bit register. The contents of these registers are programmed by the manufacturer of the secured memory. Once these registers have been programmed, and a "fuse" dedicated to the secured memory manufacturer is blown, as will be described below, the content of these registers can be read, but not altered. The Card Manufacturer Code is a 32-bit register whose contents can be programmed by the card manufacturer of the smart card on the presentation of a valid security code. As set forth above, the security code acts to secure transportation between the secured memory manufacturer and the smart card manufacturer. Once this register has been programmed, and a "fuse" dedicated to the smart card manufacturer is blown, the content of this register can be read, but not altered.

The Access Zone is partitioned into eight 8-bit Access Registers. Each of the Access Registers is a configuration register that controls the operations that can be performed in one of the User Zones and the security tests that must be satisfied before those operations can be performed. Each of the Access Registers may be programmed upon the presentation of a valid security code up until the time the fuse dedicated to the smart card issuer is blown. The Access registers may be freely read.

Figure 3:
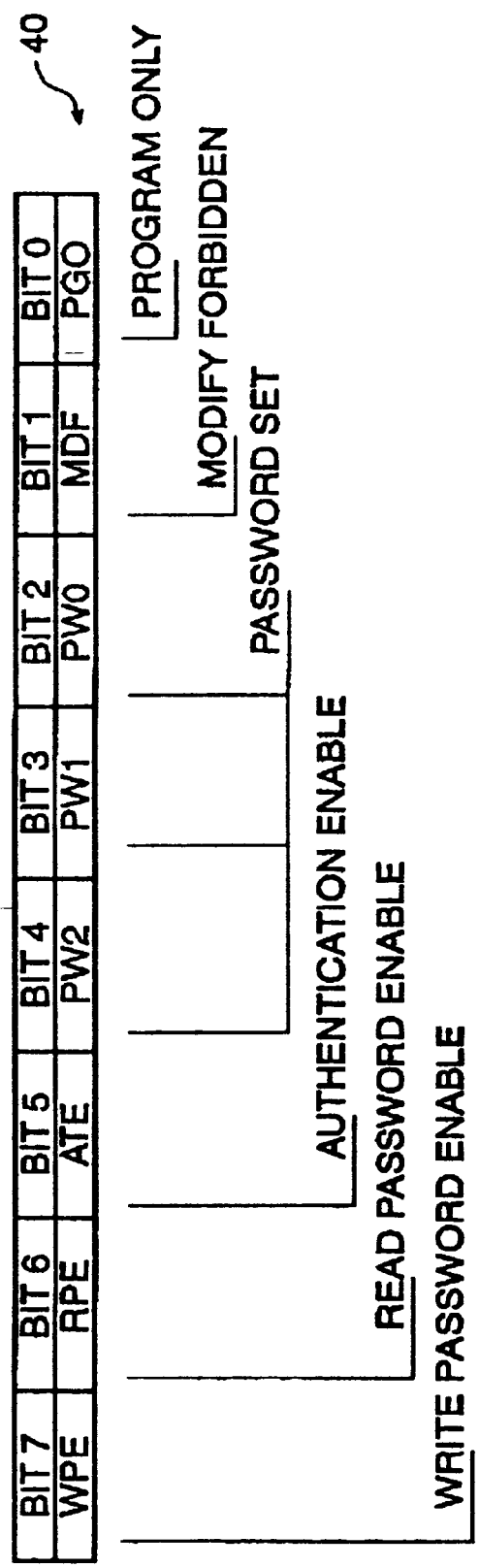
FIG. 3 illustrates a configuration register for access control to user zones according to the present invention.

An illustrative Access Register 40 is depicted in FIG. 3. The configuration bits P0–P7 in Access Register 30 are program only, modify forbidden, password set, authentication enable, read pass enable, and write password enable. When the program only configuration bit is set, the contents of the associated User Zone may only be written. When the modify forbidden configuration bit is set, the contents of the associated User Zone can not be changed. The three bits of the password set determine which of the passwords in the Password Zone are required for read and write access. There are eight sets of passwords in the Password Zone, so it should be appreciated that the three bits in the password set can be configured to identify one of the eight sets of passwords. It should be further appreciated that if two access registers have the same bit configuration in the password set two or more user zones may be tied together with the same passwords. When the authentication enable configuration bit is set, an authentication protocol that implements an anti-wiretapping feature to be described below must be satisfied before access to the associated User Zone is permitted. When the read and write enable configuration bits are set, the password for reading or writing to the respective User Zone is required.

The Authentication Zone is further partitioned into an Authentication Attempts Counter (AAC), an Identification Number, and a Cryptogram. The AAC is an eight bit counter that prevents a systematic attack on the authentication protocol that may be required before access to selected User Zones is permitted. Each time the authentication protocol is run, the AAC is incremented. If after eight attempts the authentication protocol is unsuccessful, the device becomes completely locked and cannot be accessed by anyone, including the secured memory manufacturer. Each time the authentication protocol is successful, the AAC is reset to zero.

The Identification Number, is a number up to 56-bits in length that is programmed by the smart card issuer upon the presentation of a valid security code, it should be different for each smart card issued. It should be understood that in each instance where the smart card issuer is able to program a portion of the Configuration Zone 34, that the same portion of the Configuration Zone 34 may also be programmed by the smart card manufacturer upon the presentation of a valid security code. Once the fuse dedicated to the smart card issuer is blown the identification number may not be altered. The identification number may be freely read.

The Cryptogram is a 64-bit number that is generated by the internal random number generator. In the preferred embodiment it is initially generated by the smart card issuer as a diversification of the Identification Number. Thereafter, on request of the smart card reader it is modified after each successful verification in the authentication protocol. Once the fuse dedicated to the smart card issuer is blown the Cryptogram may only be altered by the random number generator 24. Implementations of random number generators are well known to those of ordinary skill in the art and will not be described herein to avoid overcomplicating the disclosure.

The Secret Seed Zone contains a 64-bit number that is programmed by the smart card issuer upon the presentation of a valid security code. It is generated by the smart card issuer as a diversification of the Identification Number. Once the fuse dedicated to the smart card issuer is blown the secret seed may not be read or altered. The Identification Number may only be read upon the presentation of a valid security code.

The Test Zone is provided to test all the protocols of the secured memory 10 without the need for security access.

The Password Zone is partitioned into eight sets of passwords that include both a Read Password and a Write password. Associated with each password is a Password Attempts Counter (PAC). Each Read or Write Password is 24-bits in length, and each PAC is 8-bits in length. The passwords may be defined and read by the smart card issuer upon the presentation of a valid security code. After the fuse dedicated to the smart card issuer has been blown, a valid password will be required to access a User Zone if the respective read or write password enable configuration bit in an Access Register has been set. According to the preferred embodiment, as a manufacturing default, the eighth set of passwords will permit access to all User Zones.

The PACs, like the AAC described above are an eight bit counter that prevents a systematic attack on the passwords that may be required before read or write access to selected User Zones is permitted. Each time a password is presented for comparison, the associated PAC is incremented. If after eight attempts the password comparison is unsuccessful, the device becomes completely locked and cannot be accessed by anyone, including the secured memory manufacturer. Each time the password comparison is successful, the associated PAC is reset to zero. The PACs may be read by the smart card issuer upon the presentation of a valid security code. After the fuse dedicated to the smart card issuer has been blown, a particular PAC associated with a User Zone may only be written by the internal logic if the respective write password enable configuration bit in the appropriate Access Register has been set. The PACs may be freely read.

To avoid overcomplicating the present disclosure and thereby obscuring the present invention, a detailed description of the password verification and the PACs and ACC is not given herein. A detailed description of a password verification and attempts counter implementation suitable for use according to the present invention is disclosed in co-pending application Ser. No. 08/943,510, filed Oct. 3, 1997, (Entitled "SECURE MEMORY HAVING MULTIPLE SECURITY LEVELS", by inventors Jean-Pierre Benhammou, Dennis Baran, Phil Tonge and Ed Terry, and having attorney docket No. ATMDR-004), and assigned to the assignee of the present invention and specifically incorporated herein by reference, Section 36 is a Fuse Zone configured as an 8-bit register. Bits 0,1, and 2 are reserved, respectively to the secured memory 10 manufacturer, the smart card manufacturer, and the smart card issuer. After each of the portions of the configuration zone are configured by the secured memory 10 manufacturer, the smart card manufacturer, and the smart card issuer as described above, the appropriate bit in the Fuse Zone register is permanently "blown" by setting it to logic '0'. After which, the portions of the configuration zone will be accessible as described above. Further, it should be appreciated that when a fuse is blown, it is only done so under a secure code control. Also, the fuses are blown sequentially. In other words, the fuse which is blown by the smart card manufacturer can only be blown if the fuse blown by the secure memory manufacturer is 0. However, if the card manufacturer fuse is not blown by the smart card manufacturer, the card manufacturer fuse will be blown when the card issuer blows the card issuer fuse.

According to the present invention, access to the User Zones is controlled by the configuration bits in the Access Registers. As described above with regard to the Access Registers, to access a User Zone, either passwords or an authentication protocol or both may be required. For example, when a write command to a particular address in a User Zone is clocked into the ISO Serial Interface 12 through the SDA pin as is well known in the art, the Access Register for the selected User Zone will be checked for whether the configuration bits 6 and 7 require a password to be presented, and whether the authentication protocol (bit 5) must be satisfied. It should be noted that the ISO-7816-3 serial interface is well known to those of ordinary skill in the art, and accordingly the signals representing the timing diagrams for the commands which drive the ISO-7816-3 serial interface will not be disclosed herein to avoid overcomplicating the disclosure and obscuring the present invention.

If the configuration bits in the access register associated with the selected user zone are set such that a password is required, the smart card reader to which the smart card has been attached, will issue a verify password command. Once the verify password sequence is completed, and a stop condition is issued by the smart card reader, there is a non-volatile write cycle during which the PAC associated with the password being verified is updated. In order to determine whether the password provided by the card reader was correct, the smart card requires the card reader to perform an acknowledge polling sequence with a selected smart card address to read the password attempts counter corresponding to the selected password in the configuration zone. It is to be understood that the smart cards performs the act described herein without the aid of an on-board microprocessor.

Figure 4:
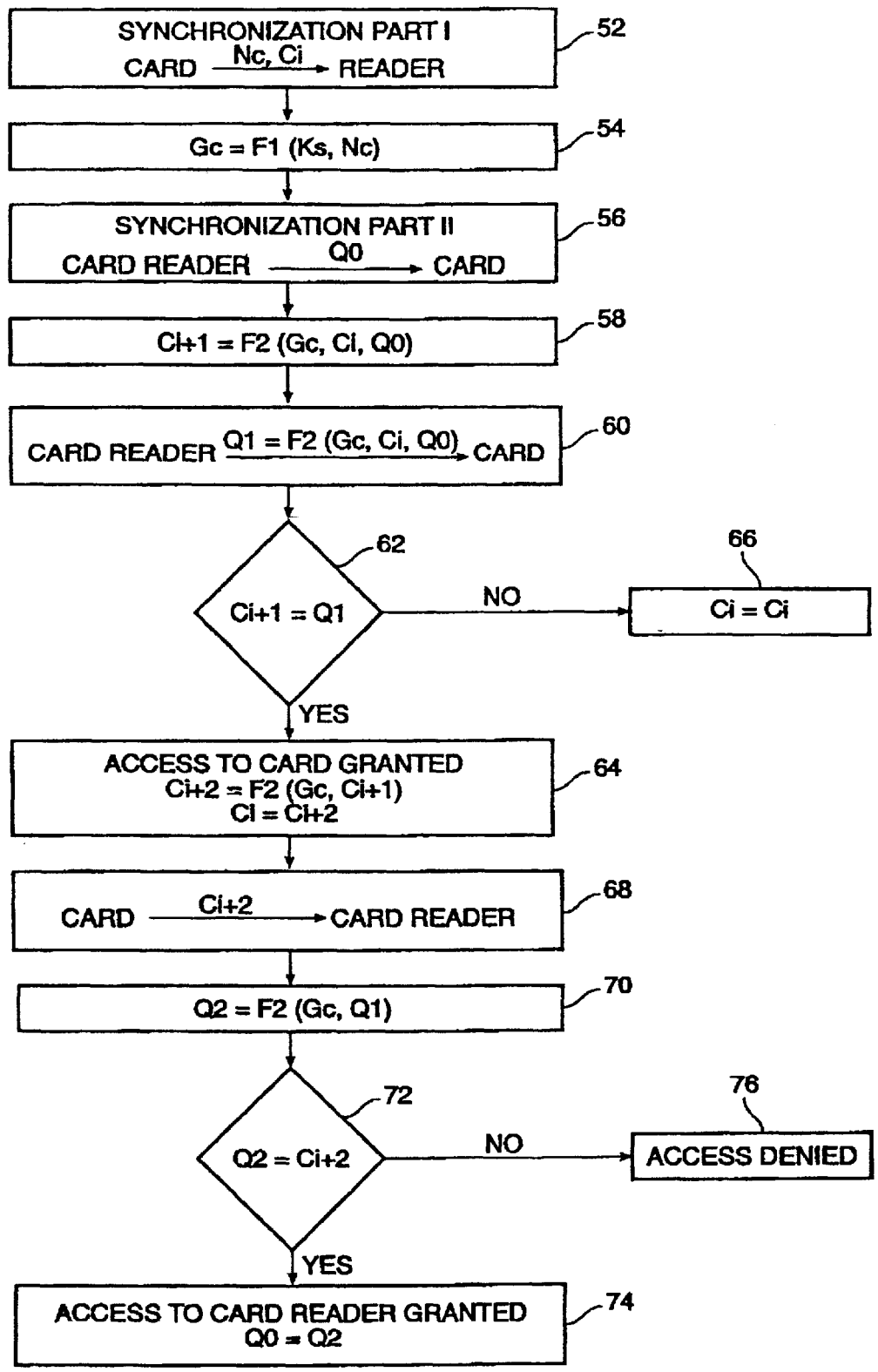
FIG. 4 illustrates a flow diagram for an authentication sequence of a card reader and a smart card suitable for use according to the present invention.

When an access to the EEPROM memory 26 requires authentication, the authentication protocol illustrated in the flow diagram 50 of FIG. 4 must be performed.

At step 52, a first part of a synchronization step is performed, wherein the card identification number, Nc, and the initial cryptogram of the card, Ci are transmitted to the card reader. Once the sequence is completed and a stop condition is issued, there is a non-volatile write cycle to clear a new bit of the AAC.

At step 54, the card reader determines the diversified secret seed, Gc, from Nc and the secret key, Ks. If the reader is unable to correctly determine Gc, the reader is identified as not being authentic because it does not have Ks, and the entire authentication protocol will fail in subsequent steps.

At step 56, a second part of the synchronization is performed wherein a random value, Qo, is sent from the card reader to the card.

At step 58, the card determines an intermediary cryptogram $C_{i+1}$ from the secret seed Gc, Ci, and Qo.

At step 60, a reader authentication value, Q1, is determined from Gc, Ci, and Qo, and transmitted by the card reader to the smart card.

At step 62, the reader compares the $C_{i+1}$ determined at step 58 with the value Q1 at step 60.

At step 64, if $C_{i+1}$ equals Q1, then card will consider the reader to be authentic, and the card determines $C_{i+2}$ from the Gc, and $C_{i+1}$ and also reinitialize the cryptogram, Ci with the value $C_{i+2}$. Otherwise, at step 66, if $C_{i+1}$ does not equal Q1, then card will not consider the reader to be authentic, and Ci will remain unchanged.

At step 68, the card transmits $C_{i+2}$ to the card reader for authentication of the card.

At step 70, the reader determines Q2 from Gc and Q1.

At step 72, the value $C_{i+2}$ is compared to the value Q2.

At step 74, if $C_{i+2}$ is equal to Q2, the card is considered authentic by the card reader, and access is obtained. The card reader also reinitializes the random number Q0 with the value Q2. Otherwise, at step 76 access is denied.

Once the valid passwords have been presented and the authentication protocol has been satisfied, the configuration zone can be accessed, and authorized operation can be performed.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a secure memory card having no on-board microprocessor, a method for accessing a user zone in the secured memory by a card reading device comprising the steps:
    checking an access register for said user zone to determine if an authentication protocol must be satisfied before access is granted to said user zone;
    performing an authentication sequence when an authentication protocol must be satisfied, the authentication sequence comprising the steps of authenticating the card reading device by the card and authenticating the card by the card reading device;
    checking an access register for said user zone to determine if a valid password for a desired access must be presented before said desired access is granted to said user zone; and
    performing a password verification sequence when a valid pass corresponding to said desired access is required before said desired access to said user zone is granted.

2. The method of claim 1 wherein the authentication step further comprises the steps:
    providing an identification number and an initial cryptogram from the card to the card reading device; and
    comparing card reading device responses with card calculated authentication data so that the card may authenticate the card reading device.

3. The method of claim 2 wherein the card reading device responses include the steps:
    calculating a secret seed from said identification number and a secret key by the card reading device;
    transmitting a random value from the card reading device to the card;
    calculating an intermediary cryptogram from said secret seed, said initial cryptogram, and said random value, by the card;
    calculating a reader authentication value from said secret seed, said cryptogram, and said random value by the card reading device; and
    comparing said intermediary cryptogram with said reader authentication value to authenticate the card reading device.

4. The method of claim 3 further comprising the steps:
    calculating a next intermediary cryptogram from said secret seed and said previous intermediary cryptogram;
    transmitting said next intermediary cryptogram from the card to the card reading device;
    calculating a next reader authentication value from said secret seed and said previous reader authentication value; and
    comparing said next intermediary cryptogram with said next reader authentication value to authenticate the card.

5. A secure memory card for accessing a user zone, characterized in the absence of a microprocessor onboard the card, comprising the combination:
    an EEPROM within the card;
    data transfer means within the card and operatively coupled to said EEPROM;
    authentication means within the card and operatively coupled to said data transfer means, said authentication means including a card reader authentication means for providing two-way authentication when the card is mated with a card reader so that the card may authenticate the read and the reader may authenticate the card;
    password verification means within the card and operatively coupled to said data transfer means;
    an access register with the card and operatively coupled to said data transfer means, said access register being checked for said user zone to determine if a valid pass word for a desired access must be presented before said desired access is granted to said user zone, and performing a password verification sequence when a valid password corresponding to said desired access is required before said desired access to said user zone is granted; and
    a bi-directional interface operatively coupled to said authentication means, said data transfer means, and said password verification means, said interface including external coupling means.

6. The secure memory card of claim 5 wherein said EEPROM includes a memory map, said memory map including a plurality of user zones and a configuration zone, said configuration zone including a fabrication zone, an access zone, an authentication zone, a secret zone, a test zone, and a password zone.

7. The secure memory card of claim 6 wherein said user zones includes eight such user zones.

8. The secure memory card of claim 7 further comprising an answer to reset register, a lot history code register, and a card manufacturer code register, within said fabrication zone, said registers being selectively programmable and selectively readable.

9. The secure memory card of claim 8 further comprising a plurality of access registers within said access zone, said access registers being selectively programmable and selectively readable.

10. The secure memory card of claim 9 further comprising an authentication attempts counter, an identification number, and a cryptogram within said authentication zone.

11. The secure memory card of claim 10 wherein said identification number is a number up to 56-bits in length.

12. The secure memory card of claim 11 further comprising a random number generator operatively coupled to said EEPROM, and wherein said cryptogram comprises a 64-bit number generated by said random number generator.

13. The secure memory card of claim 12 further comprising a 64-bit programmable number within said security zone.

14. The secure memory card of claim 13 further comprising a plurality of password sets within said password zone, each said password set including a read password and a write password, and a password attempt counter associated with each said password.

15. The secure memory card of claim 14 wherein each said password is up to 24-bits in length.

* * * * *

UNITED STATES PATENT AND TRADEMARK OFFICE
CERTIFICATE OF CORRECTION

PATENT NO. : 6,094,724
DATED : July 25, 2000
INVENTOR(S) : Benhammou, et al.

It is certified that error appears in the above-identified patent and that said Letters Patent is hereby corrected as shown below:

<u>Claim 7,</u>
Line 1, delete -- 6 -- and replace with "5".

Signed and Sealed this

Twenty-fifth Day of September, 2001

Attest:

*Nicholas P. Godici*

NICHOLAS P. GODICI
*Attesting Officer*  *Acting Director of the United States Patent and Trademark Office*